United States Patent [19]

Yamada et al.

[11] Patent Number: 4,670,793

[45] Date of Patent: Jun. 2, 1987

[54] SHARPNESS EMPHASIS SIGNAL PROCESSING

[75] Inventors: Mitsuhiko Yamada, Kyoto; Hideaki Kitamura, Osaka, both of Japan

[73] Assignee: Dainippon Screen Mfg. Co., Ltd., Kyoto, Japan

[21] Appl. No.: 695,734

[22] Filed: Jan. 25, 1985

[30] Foreign Application Priority Data

Feb. 10, 1984 [JP] Japan .................................. 59-23563

[51] Int. Cl.⁴ .......................... H04N 1/40; H04N 5/14
[52] U.S. Cl. ..................................... 358/284; 358/80; 358/166
[58] Field of Search .................. 358/21 R, 75, 78, 80, 358/166, 162, 280, 282, 283, 284

[56] References Cited

U.S. PATENT DOCUMENTS 4,319,268  3/1982  Yamada ................................ 358/80
4,335,407  6/1982  Atoji ..................................... 358/284

Primary Examiner—Tommy P. Chin
Attorney, Agent, or Firm—Lowe, Price, LeBlanc, Becker & Shur

[57] ABSTRACT

In forming a sharpness emphasis signal, accidental errors produced in digital processing of the image data of pixels in a matrix are cancelled by using look-up table memories to suppress the appearance of corresponding noises onto reproduction images. The invention further provides for use of a reduced number of bits in processing the data and particularly in processing sums of products used in the process, by providing for products to have substantially the same number of bits as the factors of the product.

24 Claims, 6 Drawing Figures

SHARPNESS EMPHASIS SIGNAL PROCESSING

FIELD OF THE INVENTION

This invention relates to processing a sharpness emphasis signal in images using an image reproducing system, more particularly to digitally processing a sharpness emphasis signal.

BACKGROUND OF THIS INVENTION

Sharpness emphasis signal processing of image reproduction by means of an image reproducing system is carried out in the following manner. At first, a sharp signal M and an unsharp signal N are obtained by respectively using a beam for analyzing the density value of a centered pixel and a beam of greater diameter for analyzing the density values of the pixels surrounding the centered pixel. Secondly the difference between the signals is computed and is multiplied by a coefficient q to produce a differentiation signal $\Delta P = q(M-N)$. Then the differentiation signal $\Delta P$ is added to the sharp signal M to produce an image signal $M + \Delta P$ having undergone sharpness emphasis (refer to FIG. 5).

The above-mentioned procedure is of course for an analog data processing, and requires both an optical system for obtaining the unsharp signal and electronic devices for processing the signal obtained therefrom, in addition to requiring the same equipment for the sharp signal.

Furthermore, the aperture size of the unsharp beam must follow that of the sharp beam. The aperture of the latter varies in accordance with the variation of the resolution power thereof, determined in accordance with a magnification ratio in reproducing images. Therefore, several sets of apertures for the sharp beam and the unsharp beam must be provided for the variation of resolution power.

In order to solve the above drawbacks, several methods are disclosed in U.S. Pat. No. 4,319,268 and U.S. Ser. No. 573,967, in both of which a sharpness emphasis signal is obtained digitally.

In these methods, at first an image data is obtained by analyzing a plurality of scanning lines of an original by means of an image input means. The data are stored into a buffer memory, and then arranged in order of scanning lines. Secondly a number of pixels located in a certain area (for example, an area comprising 3×3 pixels in the main and the sub-scanning directions) are subjected to a process for obtaining the sharp signal M and the unsharp signal N. The sharp signal M is obtained from the density value of the centered pixel (called a "center pixel" hereinafter), and the unsharp signal N is obtained by averaging the density values of the pixels surrounding the center pixel (each of which is called a "surrounding pixel") in a circuit for summing products, as hereinafter described. Then a differentiation signal $\Delta P$ is obtained by detecting the difference between the signals, and is added to the sharp signal M to obtain an image signal $M \times \Delta P$ having undergone sharpness emphasis. The aforesaid circuit for summing products computes data according to an expression:

$$N = K \cdot \frac{\sum_{j=1}^{n} a_j \cdot V_{Ij}}{n} \quad (1)$$

wherein $a_j$ is a weight coefficient to be given to the surrounding pixel $I_j$ (which may depend on the weight coefficient given the center pixel $I_0$), while $V_{Ij}$ is the density value of the surrounding pixel, n is the number of the surrounding pixels submitted to be processed at one time, and K is a coefficient defined as follows.

Properly, the sharp signal M (the density value $V_{I0}$ of the center pixel $I_0$) and the unsharp signal N (the density value $V_{Ij}$ of the surrounding pixel) must agree with each other when the area subjected to the process is not a boundary between constituent images but an area of constant density distribution. In order to make them equal, the value $$\frac{\sum_{j=1}^{n} a_j \cdot V_{Ij}}{n}$$

is multiplied by the weight coefficient K.

Nevertheless, this method has a drawback that a multiplier for performing a computation $a_j \times V_{Ij}$ must have a capability of dealing with a signal of twice as many bits as each of the values $a_j$ and $V_{Ij}$, which results in an increase in production cost for the device.

Supposing the computation $a_j \times V_{Ij}$ is restricted to be performed in a limited number of bits, for example, in 8 bits, then, since the computation $$\sum_{j=1}^{n} a_j \times V_{Ij}$$

must be performed in a greater number of bits, such an effort for limiting the bit number becomes meaningless.

Furthermore, in order to perform the aforesaid computation $$\sum_{j=1}^{n} a_j \times V_{Ij}$$

in a practical number of bits, for example, in 8 bits, the number of bits used for expressing the computation result of $a_j \times V_{Ij}$ and each of the subsequent additions must be reduced. During the computation process, an accidental error may be produced, and may provide an obstacle to obtaining the accurate unsharp signal.

As mentioned before, the sharp signal M and the unsharp signal N must agree with each other when they are obtained from an area of constant density distribution where the density values of the center pixel and any of the surrounding pixels are the same. In other words, the differentiation signal $\Delta P$ must be zero. However, an accidental error as above mentioned may disturb the theoretical relation between the signals, so that the differentiation signal $\Delta P$ does not become zero. The differentiation signal $\Delta P$ obtained under the influence of the error is to be added to the sharp signal (the density value of the center pixel) as DC (Direct Current) noise, which undesirably modifies the reproduction image recorded thereby.

This kind of drawback of course exists in a conventional method in which a sharp signal M and an unsharp signal N are obtained in an analog fashion. That is, since optical systems for obtaining the sharp signal M and the unsharp signal N are independently provided, the correspondence between both the signals is not always maintained, which fact also requires an adjustment effort to be added thereto.

SUMMARY OF THE INVENTION

Accordingly, it is an object of this invention to provide a method and system for processing a sharpness emphasis signal digitally in a limited number of bits, in which a differentiation signal ΔP is made to be precisely zero when the density value of a center pixel agrees with that of every surrounding pixel.

It is another object of this invention to provide the above method and system in which arbitrary weight coefficients can be given to the pixels.

It is a further object of this invention to provide a method and system for the above which do not require a multiplier utilizing an increased number of bits for multiplying the density value of each of the pixels by the corresponging weight coefficient.

To actualize the above-mentioned objects, this invention comprises the following processes.

The image data of the center pixel and the surrounding pixels of a matrix of pixels, which are expressed in Q bits (Q being an integer), are input to a sum of products adder circuit to obtain an unsharp signal. The sum of products adder manipulates each of the data in only Q bits as described afterwards, while an unsharp signal N', which is the output of the sum of products adder, is also a Q bit signal. The unsharp signal N' is approximately proportional to the computational result of the expression (1), and comprises an error as a Q bit signal. Weight coefficients to be given to the pixels should be determined so that the maximum value of the unsharp signal N' comes close to the maximum value expressible in Q bits. The sharp signal must agree with the unsharp signal when the signals are obtained not from a boundary area but from an area where the density values of all the pixels are the same. Therefore the innate sharp signal M obtained from the center pixel is adjusted by means of a first look-up table memory to be another sharp signal M' identical to the unsharp signal N'. The thus-obtained sharp signal M' and the unsharp signal N' undergo a conventional process for producing an image signal M+ΔP representing emphasized sharpness.

The sum of products adding circuit processes the data in Q bits (usually 8 bits). That is, at first the computation $a_j \times V_{Ij}$ (where both $a_j$ and $V_{Ij}$ are Q bit signals) is carried out under the control of a CPU. Then the computation results are truncated to be stored into the location whose address in a look-up table memory is $V_{Ij}$. Then the computation $a_1 \times V_{I1} + \ldots + a_j \times V_{Ij}$ is performed in 8 bits by multiplying the sums of terms by one half in the sum of products adder.

When the weight coefficient $a_j$ is sufficiently large, the output of the final adder exceeds Q bits. In such a case, the final adder is preferably capable of outputting a signal of Q+1 bits, and the output should be adjusted by means of a second look-up table memory. When the output of the final adder provides the reading address data to the second look-up btable memory, the memory outputs a corresponding Q bit data previously stored therein by multiplying the output of the final adder by a coefficient such that the product becomes the maximum number expressible in Q bits.

When the sum of products adder is capable of dealing with data of Q+1 bits, the first look-up table memory is not necessary since the second look-up table memory outputs all the numbers expressible in Q bits.

The above and other objects and features of this invention will be appreciated more fully from the following detailed description when read with reference to the accompanying drawings.

PREFERRED EMBODIMENT OF THE INVENTION

Figure 1:
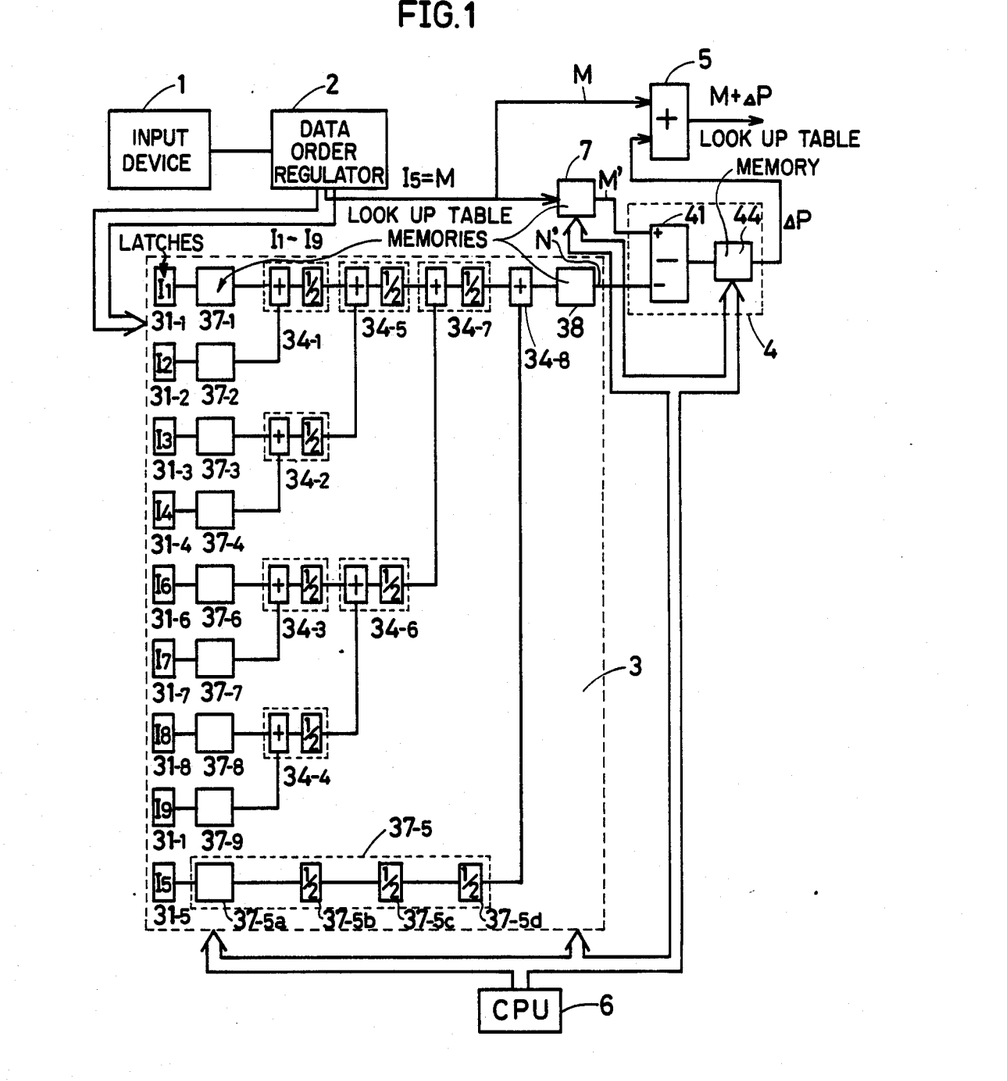
FIG. 1 shows an embodiment of this invention.
Figure 4:
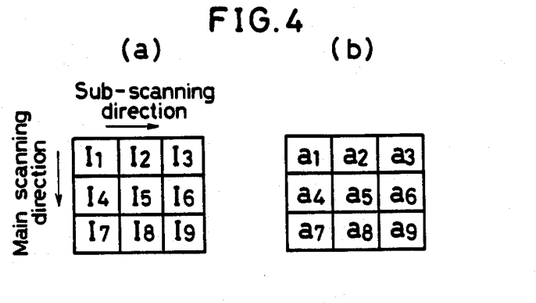
FIG. 4 shows pixels in a matrix to be put to a sharpness emphasis process at a time and weight coefficients to be given to the pixels respectively.

FIG. 1 shows a sharpness emphasis circuit of this invention, in which nine pixels $I_1$ to $I_9$ as shown in FIG. 4(a) are given weight coefficients $a_1$ to $a_9$ as shown in FIG. 4(b) respectively.

Figure 6:
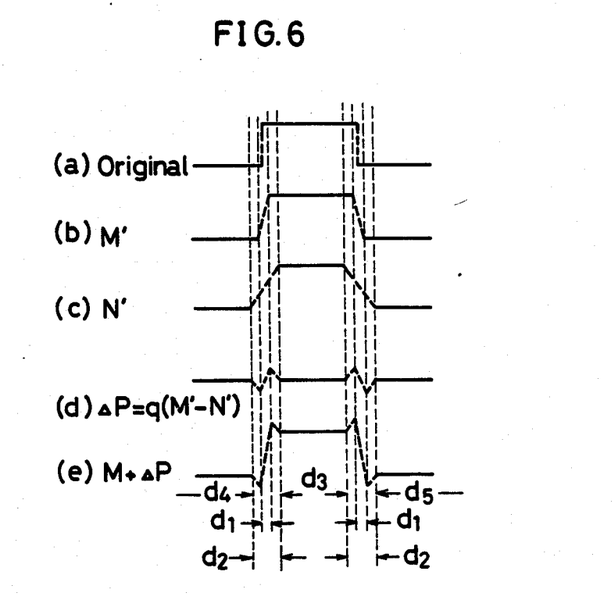
FIG. 6 shows the wave forms observed in several points of the embodiments shown in FIG. 1.

FIG. 6 shows the forms of the signals, in which abrupt rising or falling portions correspond to the boundary between constituent images.

In an input device 1, image data are obtained by analytically scanning an original mounted on an input drum with use of an input head. The data are output after undergoing A/D conversion. The image data of each scanning line is input to a data order regulator 2 comprising line memories every certain number of scanning lines necessary for the next process of summing products. From the data order regulator 2, the image data are output in a matrix form as shown in FIG. 4(a) every moment to a sum of products adder according to a well-known manner. The sum of products adder produces an unsharp signal N' using the image data as hereinafter described, and the unsharp signal N' is input to the negative terminal of a subtracter 41. On the other hand, a sharp signal M obtained from a center pixel $I_5$ are adjusted by a look-up table memory 7 to be an adjusted sharp signal M', which is subsequently input to the positive terminal of the subtracter 41. The subtracter 41 performs a subtraction M'−N', and the result thereof is input to a look-up table memory 44, which multiplies the difference by a coefficient q to output a signal ΔP to an adder 5. The adder 5 adds the sharp signal M input thereto separately to the signal ΔP to produce a sharpness emphasis signal M+ΔP.

The sum of products adder 3 is constructed as follows, assuming that data are processed in a specified number of bits, that is, 8 bits in this case, the same number of bits used for expressing the image data. At first the image (density) data of nine memory locations $I_1$ to $I_9$ obtained from the data order regulator 2 are simultaneously latched in latches $31_{-1}$ to $21_{-9}$. Look-up table memories $37_{-1}$ to $37_{-9}$ store values $a_j \times V_{Ij}$ with the value $V_{Ij}$ being the reading address of the memories. At that juncture, since the product of the value $a_j \times V_{Ij}$ becomes a number of 16 bits, the number derived from a computation:

$$a_j \times V_{Ij} \times (\tfrac{1}{2}^8) = a_j \times V_{Ij} \times (1/256) \qquad (2)$$

is prepared for each possible value of $V_{Ij}$ before hand in a CPU to truncate the 8 least significant bits of the number of the product.

Therefore, when the image (density) data $V_{Ij}$ of each pixel is input from the latches $31_{-1}$ to $31_{-9}$ to the look-up table memories $37_{-1}$ to $37_{-9}$ respectively, a value obtained via the computation (2) corresponding to each of the value $V_{Ij}$ is output. The outputs of the look-up table memories $37_{-1}$ and $37_{-2}$ are summed in an adder $34_{-1}$. Since the sum thereof becomes a 9 bit number, by truncating the lowest 1 bit (i.e., multiplying by one half) the 8 most significant bits of the number are obtained. The same process is carried out on the outputs of the look-up table memories $37_{-3}$ and $37_{-4}$ in an adder $34_{-2}$, the output of the look-up table memories $37_{-6}$ and $37_{-7}$ in an adder $34_{-3}$, and the output of the look-up table memories $37_{-8}$ and $37_{-9}$ in an adder $34_{-4}$.

The outputs of the adders $34_{-1}$ and $34_{-2}$ are added in an adder $34_{-5}$ and the sum thereof, being a 9 bit number, is multiplied by one half. The same process is carried out on the outputs of the adders $34_{-3}$ and $34_{-4}$ in an adder $34_{-6}$. Thereafter, the outputs of the adders $34_{-5}$ and $34_{-6}$ are added in an adder $34_{-7}$ and the sum thereof is multiplied by one half. Consequently, a value of $(\frac{1}{8}) \times (1/256)$ $(a_1I_1 + \ldots a_4I_4 + a_6I_6 + \ldots a_9I_9)$ is output from the adder $34_{-7}$ to an adder $34_{-8}$.

In the meantime, the look-up table memory $37_{-5}$, to which the image data $V_{I5}$ of the center pixel $I_5$ is input, outputs a value of:

$$a_5 \times I_5 \times (1/256) \times (\tfrac{1}{8}) \qquad (3)$$

to the adder $34_{-8}$. In this computation, the coefficient $a_5$ is ordinarily 1, and the purpose by dividing the value $a_5 \times I_5 \times (1/256)$ by 8 is to adjust the figures of the number and that of the output of the adder $34_{-7}$ (normalize).

The adder $34_{-8}$ sums up both the values and outputs the sum to a look-up table mamory 38 as the address data thereof. If unsharp signals are produced without using the image data of the center signal, the latch $31_{-5}$, the look-up table memory $37_{-5}$ and the adder $34_{-8}$ are unnecessary.

At this juncture, when the value N of the equation (1) is required to be accurate, there should be output from the look-up table memory a value obtained by multiplying the value of the address data by a coefficient of $(8/9)K$. However, since the differentiation signal $\Delta P$ is obtained by multiplying a value $M-N$ by an arbitrary coefficient q, a desirably-emphasized signal can be obtained by adjusting the coefficient q.

Therefore in this embodiment, the output of the adder $34_{-8}$ corresponding to the unsharp signal N is input as an unsharp signal N' via the look-up table memory 38 to the negative terminal of the subtracter 41 as it is (a sharp signal M' is mentioned afterwards). When the output of the adder $34_{-8}$ cannot be expressed in 8 bits as hereinafter described, the look-up table memory 38 adjusts the output so as to express it in 8 bits in outputting it to the nagative terminal of the subtracter 41.

When the value N' is used as and subtractive input to the subtracter 41, and additive input thereto must be an adjusted value M' corresponding to the value N' as the sharp signal. More precisely, the value M must agree with the value N' corresponding to the unsharp signal N' when both the values are obtained from an area comprising no boundary wherein the center pixel and each of the surrounding pixels have the same density value. In order to satisfy the above condition, a look-up table memory 7 is provided, having reading addresses correponding to the sharp signal M. The look-up memory 7 supplies the signal of value M', corresponding to the output of the look-up table memory 38, to the positive terminal of the subtracter 41. The data stored in the look-up table memory 7 is computed beforehand by the CPU.

The following discription illustrates that the thus-constructed averaging circuit 3 for summing products never produces noise when the input thereto represents image data of an area comprising no boundary wherein all the pixels $V_{I1}$ to $V_{I9}$ have the same density.

Figure 5:
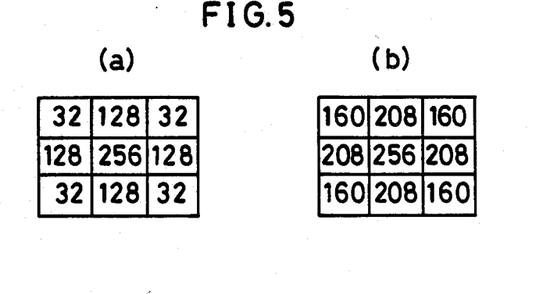
FIG. 5 shows two examples of a matrix of coefficients given to the corresponding pixels.

Table 1 shows the outputs of the look-up table memories $37_{-1}$ to $37_{-9}$, the outputs of the adders $34_{-1}$ to $34_{-8}$, the input and the output of the look-up table memory 38 and the input and the output of the look-up table memory 7 when the weight coefficients shown in FIG. 5(a) are assigned to the pixels as shown in FIG. 4(b) respectively. In FIG. 5(a), the coefficient to be assigned to the center pixel $a_5=1$ is expressed as the binary number 100,000,000 and the coefficients to be given to the surrounding pixels are expressed in 8 bits as quantized numbers respectively. In table 1, since the output of the adder $34_{-8}$ is lower than the highest value expressible by 8 bits (255), the input and the output of the look-up table memory 38 are identical. Since the adjusted sharp signal M' must agree with the output of the look-up table memory 38, the innate sharp signal M is subjected to an adjustment process in the look-up table memory 7 before being output.

In this regard, when the sharp signal M' and the unsharp signal N' are expressed in less than 4 bits, the 8 bits are not efficiently used.

Accordingly, when the coefficients shown in FIG. 5(a) are modified by multiplication by a second coefficient $\alpha = 256/128$ $(=2)$ to provide modified coefficients, values to be set up to the look-up table memories $37_{-1}$ $\ldots 37_{-4}, 37_{-6} \ldots 37_{-9}$ are derived from:

$$a_j \times V_{Ij} \times (1/256) \times (256/128) \qquad (4)$$

while the value to be set up to the look-up table memory $37_{-5}$ is derived from:

$$a_5 \times V_{I5} \times (1/256) \times (\tfrac{1}{8}) \times (256/128) \qquad (5)$$

consequently the output values of the devices are as shown in Table 2, from which the 8 bits are observed to be used fairly efficiently. The reason the coefficient (256/128) is adopted is to keep the maximum of the capacity of the memories $37_{-2}, 37_{-4}, 37_{-6}$ and $37_{-8}$, managing the second largest value of the memories $37_{-1}$ to $37_{-9}$ (memories corresponding to the pixels to which the second highest coefficient is given) under 255 (8 bits).

On the other hand, the memory $37_{-5}$ which manages the pixel to which the highest coefficient is given is never compelled to manage the number exceeding 255 (8 bits) because the image data of the center pixel is multiplied by $(\tfrac{1}{8})$.

Figure 2:
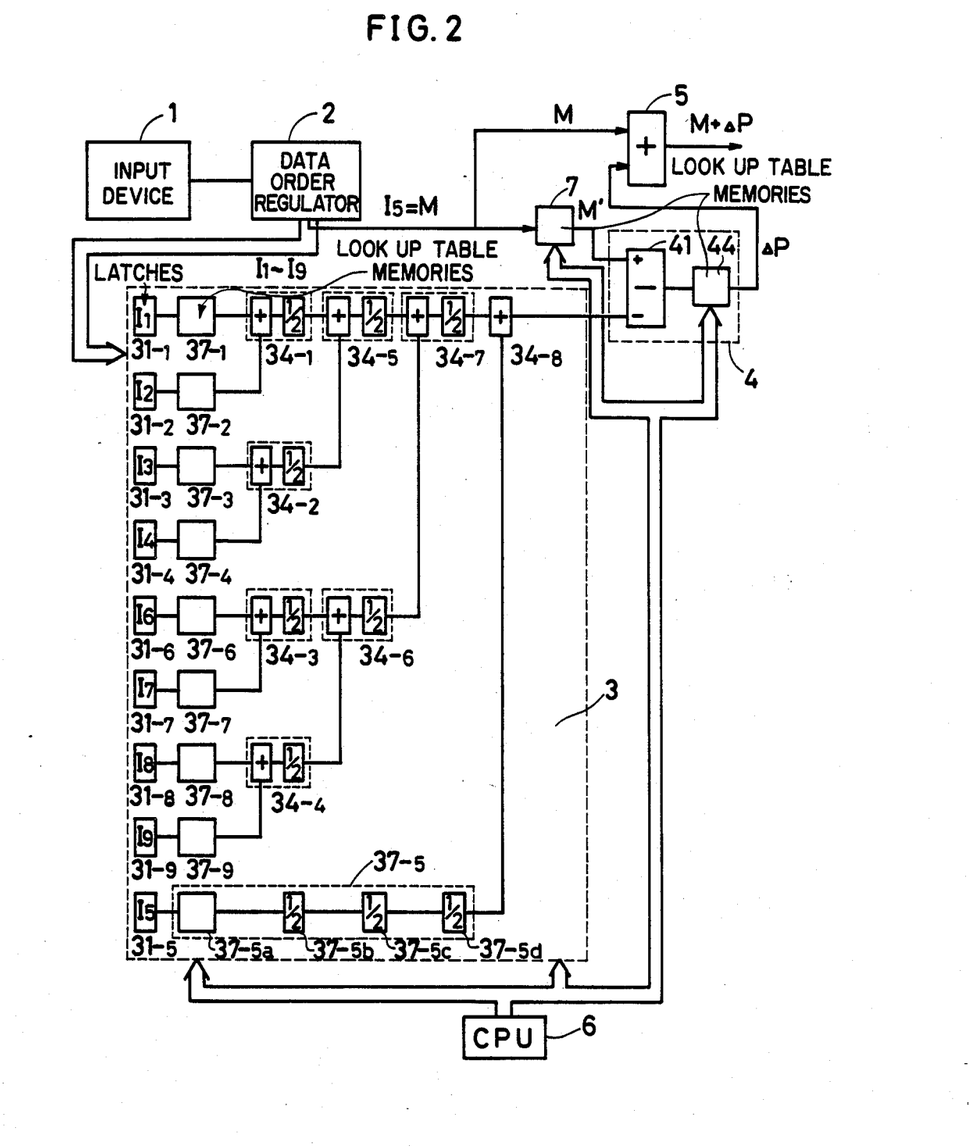
FIG. 2 shows another embodiment of this invention.

In the above two examples, since the output of the adder $34_{-8}$ can be expressed in 8 bits, the input (address data) and the output of the look-up table memory 38 become the same. Accordingly, the look-up table memory is substantially unnecessary, so that a system as shown in FIG. 2 can be used instead. However, weight coefficients as shown in FIG. 5(b) is multiplied by a second coefficient (256/208) to provide the modified weight coefficients, adjustment by the look-up table memory 38 is necessary. More particularly, values to be provided to the look-up memories $37_{-1} \ldots 37_{-4}, 37_{-6}$ ... 37$_{-9}$ correspond to an expression $a_j \times V_{Ij} \times (1/256) \times (256/208)$, while values to be provided to the look-up table memory 37$_{-5}$ correspond to an expression $a_5 \times V_{I5} \times (1/256) \times (\frac{1}{8}) \times (256/208)$. Consequently, the output of the adder 34$_{-8}$ exceeds the number 255 (8 bits) and can not be expressed in the same specific number of bits with the density data, that is, 8 bits in this case when the density data $V_{I1}$ to $V_{I9}$ of the respective pixels $I_1$ to $I_9$ become sufficiently high, as shown in Table 3.

Therefore, values obtained by multiplying the output of the adder 34$_{-8}$ by a specific coefficient (adjusted so as not to exceed the number 255 (8 bits)) are previously stored in the look-up table memory 38 and are output in accordance with the output of the adder 34$_{-8}$ being the reading address data for the stored values.

As observed in Table 3, since the look-up table memory 38 does not output specific numbers such as 251 and 242, when the image data of the center pixel takes one of the specific values, the look-up table memory 7 provides an adjustment thereof.

In the example of Table 3, since the output of the adder 34$_{-8}$ becomes a 9 bit number when the value $V_{Ij}$ is sufficiently high, the adder 34$_{-8}$ must be capable of managing 9 bit numbers, and there is accordingly needed a look-up table memory 38 for converting the 9 bit numbers to corresponding 8 bit numbers. Such an adder 34$_{-8}$ and a look-up table memory 38 enable the sum of products adder to cope with the computation of Table 3.

The following description is based on a sum of products adder circuit 3 capable of dealing with a digital signal of 9 bits, a bit larger number than that of the image data (the specific number of bits, that is, 8 bits in this case).

When the coefficients shown in FIG. 5(a) are multiplied by the second coefficient $\alpha = (256/128)$ ($=2$) to be used as modified coefficients, values to be provided to the look-up table memories 37$_{-1}$ ... 37$_{-4}$, 37$_{-6}$ ... 37$_{-9}$ are derived from:

$$a_j \times V_{Ij} \times (1/128) \times (256/128) \quad (6)$$

while the value to be set up to the look-up table memory 37$_{-5}$ is derived from:

$$a_5 \times V_{I5} \times (\frac{1}{8}) \times (1/128) \times (256/128) \quad (7)$$

Consequently the output values of the devices are as shown in Table 4.

When the coefficients shown in FIG. 5(b) are multiplied by a second coefficient $\beta = (256/208)$ to be used as modified coefficients, the output values of the devices are as shown in Table 5. At this juncture, since the output of the adder 34$_{-8}$ becomes a 10 bit number when the value $V_{Ij}$ is sufficiently high, the adder 34$_{-8}$ must be capable of managing 10 bit numbers as corresponding 8 bit numbers. Such an adder 34$_{-8}$ and a look-up table memory 38 enables the sum of products adder to cope with the computation of Table 5.

Figure 3:
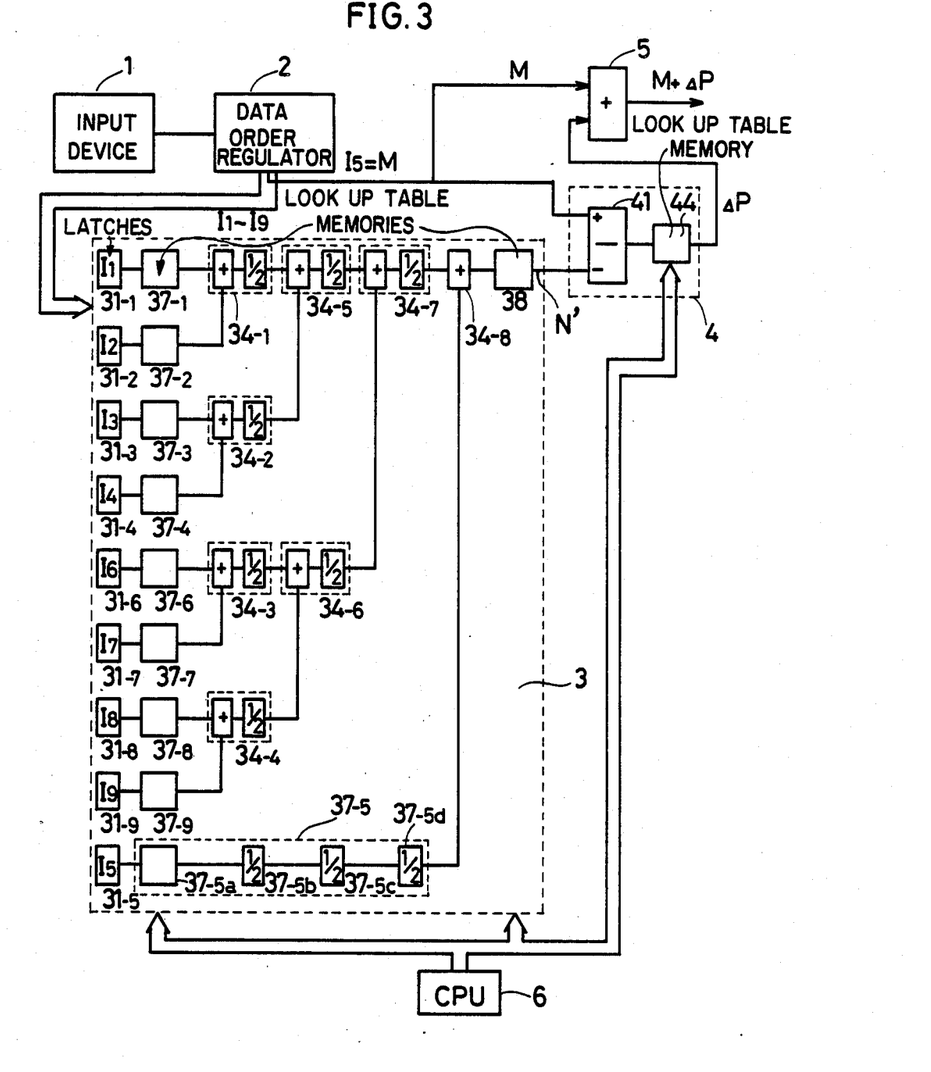
FIG. 3 shows yet another embodiment of this invention.

In the embodiment of Tables 4 and 5, since the output of the look-up table memory 38 takes all the numbers of 0 to 255, there is no need to carry out the adjustment process as stated on Table 3, therefore, a circuit as shown in FIG. 3 is adoptable.

It should be noted the unsharp signal can be obtained from only the surrounding pixels $I_1 \ldots I_4, I_6 \ldots I_9$.

As mentioned above, since the first look-up table memory is made so that the unsharp signal obtained from the sum of products adder agrees with the adjusted sharp signal obtained from the first look-up table memory, the process of summing products can be carried out in the same number of bits as used for expressing the image data (comparatively in fewer bits), which fact therefore leads to the reduction of system cost.

According to the values of the weight coefficients provided to the pixels to be processed, the output of the process of summing products sometimes exceeds the bit number of the image data by one bit, at which time the output of the sum of products adder can be adjusted by means of the second look-up table memory to obtain the same result as above.

When the process of summing products is performed in a number of bits greater by one bit than the number of bits for expressing the image data, the first look-up table memory can be eliminated.

The foregoing description of the preferred embodiment of the invention has been presented for purposes of illustration and description, and is not intended to be exhaustive or to limit the invention to the precise forms disclosed, since many obvious modifications and variations are possible in the light of the above teaching. The embodiment was chosen and described in order best to explain the principles of the invention and its practical application, thereby to enable others skilled in the art best to utilize the invention in various embodiments and with various modifications as are suited to the particular use contemplated. It is intended that the scope of the invention be defined by the claims appended hereto, when interpreted in accordance with the full breadth to which they are fairly and legally entitled.

TABLE 1

| Density value of the pixels $I_1$ to $I_9$ | 255 | 254 | 253 | 252 | 251 | 250 | 249 | 248 | 247 | 246 | 245 | 244 | 243 | 242 | 241 | 240 | — | 0 |
|---|---|---|---|---|---|---|---|---|---|---|---|---|---|---|---|---|---|---|
| Output of the look-up table memories 37$_{-1}$, 37$_{-3}$, 37$_{-7}$, 37$_{-9}$ | 31 | 31 | 31 | 31 | 31 | 31 | 31 | 31 | 30 | 30 | 30 | 30 | 30 | 30 | 30 | 30 | — | 0 |
| Output of the look-up table memories 37$_{-2}$, 37$_{-4}$, 37$_{-6}$, 37$_{-8}$ | 127 | 127 | 126 | 126 | 125 | 125 | 124 | 124 | 123 | 123 | 122 | 122 | 121 | 121 | 120 | 120 | — | 0 |
| Output of the adders 34$_{-1}$ to 34$_{-4}$ | 79 | 79 | 78 | 78 | 78 | 78 | 77 | 77 | 76 | 76 | 76 | 76 | 75 | 75 | 75 | 75 | — | 0 |
| Output of the adders 34$_{-5}$, 34$_{-6}$ | 79 | 79 | 78 | 78 | 78 | 78 | 77 | 77 | 76 | 76 | 76 | 76 | 75 | 75 | 75 | 75 | — | 0 |
| Output of the adder 34$_{-7}$ | 79 | 79 | 78 | 78 | 78 | 78 | 77 | 77 | 76 | 76 | 76 | 76 | 75 | 75 | 75 | 75 | — | 0 |
| Output of the look-up table memory | 31 | 31 | 31 | 31 | 31 | 31 | 31 | 31 | 30 | 30 | 30 | 30 | 30 | 30 | 30 | 30 | — | 0 |

TABLE 1-continued

| | | | | | | | | | | | | | | | | | | | |
|---|---|---|---|---|---|---|---|---|---|---|---|---|---|---|---|---|---|---|---|
| $37_{-5}$ | | | | | | | | | | | | | | | | | | | |
| Output of the adder $34_{-8}$ | | 110 | 110 | 109 | 109 | 109 | 109 | 108 | 108 | 106 | 106 | 106 | 106 | 105 | 105 | 105 | 105 | — | 0 |
| Look-up table memory 38 | Input | 110 | 109 | 108 | 107 | 106 | 105 | — | — | — | — | — | — | — | — | — | — | — | 0 |
| | Output | 110 | 109 | 108 | 108 | 106 | 105 | — | — | — | — | — | — | — | — | — | — | — | 0 |
| Look-up table memory 7 | Input $I_5$ | 255 | 254 | 253 | 252 | 251 | 250 | 249 | 248 | 247 | 246 | 245 | 244 | 243 | 242 | 241 | 240 | — | 0 |
| | Output | 110 | 110 | 109 | 109 | 109 | 109 | 108 | 108 | 106 | 106 | 106 | 106 | 105 | 105 | 105 | 105 | — | 0 |

TABLE 2

| | | | | | | | | | | | | | | | | | | |
|---|---|---|---|---|---|---|---|---|---|---|---|---|---|---|---|---|---|---|
| Density value of the pixels $I_1$ to $I_9$ | 255 | 254 | 253 | 252 | 251 | 250 | 249 | 248 | 247 | 246 | 245 | 244 | 243 | 242 | 241 | 240 | — | 0 |
| Output of the look-up table memories $37_{-1}$, $37_{-3}$, $37_{-7}$, $37_{-9}$ | 63 | 63 | 63 | 63 | 62 | 62 | 62 | 62 | 61 | 61 | 61 | 61 | 60 | 60 | 60 | 60 | — | 0 |
| Output of the look-up table memories $37_{-2}$, $37_{-4}$, $37_{-6}$, $37_{-8}$ | 255 | 254 | 253 | 252 | 251 | 250 | 249 | 248 | 247 | 246 | 245 | 244 | 243 | 242 | 241 | 240 | — | 0 |
| Output of the adders $34_{-1}$ to $34_{-4}$ | 159 | 158 | 158 | 157 | 156 | 156 | 155 | 155 | 154 | 153 | 153 | 152 | 151 | 151 | 150 | 150 | — | 0 |
| Output of the adders $34_{-5}$, $34_{-6}$ | 159 | 158 | 158 | 157 | 156 | 156 | 155 | 155 | 154 | 154 | 153 | 152 | 151 | 151 | 150 | 150 | — | 0 |
| Output of the adder $34_{-7}$ | 159 | 158 | 158 | 157 | 156 | 156 | 155 | 155 | 154 | 153 | 153 | 152 | 151 | 151 | 150 | 150 | — | 0 |
| Output of the look-up table memory $37_{-5}$ | 63 | 63 | 63 | 63 | 62 | 62 | 62 | 62 | 61 | 61 | 61 | 61 | 60 | 60 | 60 | 60 | — | 0 |
| Output of the adder $34_{-8}$ | 222 | 221 | 221 | 220 | 218 | 218 | 217 | 217 | 215 | 214 | 214 | 213 | 211 | 211 | 210 | 210 | — | 0 |
| Look-up table memory 38 Input | 222 | 221 | 220 | 219 | 218 | 217 | 216 | 215 | 214 | 213 | 212 | 211 | 210 | — | — | — | — | 0 |
| Look-up table memory 38 Output | 222 | 221 | 220 | 220 | 218 | 217 | 217 | 215 | 214 | 213 | 213 | 211 | 210 | — | — | — | — | 0 |
| Look-up table memory 7 Input $I_5$ | 255 | 254 | 253 | 252 | 251 | 250 | 249 | 248 | 247 | 246 | 245 | 244 | 243 | 242 | 241 | 240 | — | 0 |
| Look-up table memory 7 Output | 222 | 221 | 221 | 220 | 218 | 218 | 217 | 217 | 215 | 214 | 214 | 213 | 211 | 211 | 210 | 210 | — | 0 |

TABLE 3

| | | | | | | | | | | | | | | | | | | | |
|---|---|---|---|---|---|---|---|---|---|---|---|---|---|---|---|---|---|---|---|
| Density value of the pixels $I_1$ to $I_9$ | 255 | 254 | 253 | 252 | 251 | 250 | 249 | 248 | 247 | 246 | 245 | 244 | 243 | 242 | 241 | 240 | — | — | 0 |
| Output of the look-up table memories $37_{-1}$, $37_{-3}$, $37_{-7}$, $37_{-9}$ | 196 | 195 | 194 | 193 | 193 | 192 | 191 | 190 | 189 | 189 | 188 | 187 | 186 | 186 | 185 | 184 | — | — | 0 |
| Output of the look-up table memories $37_{-2}$, $37_{-4}$, $37_{-6}$, $37_{-8}$ | 255 | 254 | 253 | 252 | 251 | 250 | 249 | 248 | 247 | 246 | 245 | 244 | 243 | 242 | 241 | 240 | — | — | 0 |
| Output of the adders $34_{-1}$ to $34_{-4}$ | 225 | 224 | 223 | 222 | 222 | 221 | 220 | 219 | 218 | 217 | 216 | 215 | 214 | 214 | 213 | 212 | — | — | 0 |
| Output of the adders $34_{-5}$, $34_{-6}$ | 225 | 224 | 223 | 222 | 222 | 221 | 220 | 219 | 218 | 217 | 216 | 215 | 214 | 214 | 213 | 212 | — | — | 0 |
| Output of the adder $34_{-7}$ | 225 | 224 | 223 | 222 | 222 | 221 | 220 | 219 | 218 | 217 | 216 | 215 | 214 | 214 | 213 | 212 | — | — | 0 |
| Output of the look-up table memory $37_{-5}$ | 39 | 39 | 38 | 38 | 38 | 38 | 38 | 38 | 38 | 37 | 37 | 37 | 37 | 37 | 37 | 36 | — | — | 0 |
| Output of the adder $34_{-8}$ | 264 | 263 | 261 | 260 | 260 | 259 | 258 | 257 | 256 | 254 | 253 | 252 | 251 | 251 | 250 | 248 | — | — | |
| Look-up table memory 38 Input | 264 | 263 | 262 | 261 | 260 | 259 | 258 | 257 | 256 | 255 | 254 | 253 | 252 | 251 | 250 | 249 | 248 | — | 0 |
| Look-up table memory 38 Output | 255 | 254 | 254 | 253 | 252 | 250 | 249 | 248 | 247 | 247 | 246 | 245 | 244 | 243 | 241 | 240 | 240 | — | 0 |
| Look-up table memory Input $I_5$ | 255 | 254 | 253 | 252 | 251 | 250 | 249 | 248 | 247 | 246 | 245 | 244 | 243 | 242 | 241 | 240 | — | — | 0 |
| Look-up table memory Output | 255 | 254 | 253 | 252 | 252 | 250 | 249 | 248 | 247 | 246 | 245 | 244 | 243 | 243 | 241 | 240 | — | — | 0 |

TABLE 4

| Density value of the pixels I₁ to I₉ | 255 | 254 | 253 | 252 | 251 | 250 | 249 | 248 | 247 | 246 | 245 | 244 | 243 | 242 |
|---|---|---|---|---|---|---|---|---|---|---|---|---|---|---|
| Output of the look-up table memories $37_{-1}$, $37_{-3}$, $37_{-7}$, $37_{-9}$ | 127 | 127 | 126 | 126 | 125 | 125 | 124 | 124 | 123 | 123 | 122 | 122 | 121 | 121 |
| Output of the look-up table memories $37_{-2}$, $37_{-4}$, $37_{-6}$, $37_{-8}$ | 510 | 508 | 506 | 504 | 502 | 500 | 498 | 496 | 494 | 492 | 490 | 488 | 486 | 484 |
| Output of the adders $34_{-1}$ to $34_{-4}$ | 318 | 317 | 316 | 315 | 313 | 312 | 311 | 310 | 308 | 307 | 306 | 305 | 303 | 302 |
| Output of the adders $34_{-5}$, $34_{-6}$ | 318 | 317 | 316 | 315 | 313 | 312 | 311 | 310 | 308 | 307 | 306 | 305 | 303 | 302 |
| Output of the adder $34_{-7}$ | 318 | 317 | 316 | 315 | 313 | 312 | 311 | 310 | 308 | 307 | 306 | 305 | 303 | 302 |
| Output of the look-up table memory $37_{-5}$ | 127 | 127 | 126 | 126 | 125 | 125 | 124 | 124 | 123 | 123 | 122 | 122 | 121 | 121 |
| Output of the adder $34_{-8}$ | 445 | 444 | 442 | 441 | 439 | 437 | 435 | 434 | 431 | 430 | 428 | 427 | 424 | 423 |
| Look-up table memory 38   Input | 445 | 444 | 443 | 442 | 441 | 440 | 439 | 438 | 437 | 436 | 435 | 434 | 433 | 432 |
| Look-up table memory 38   Output | 255 | 254 | 254 | 253 | 252 | 252 | 251 | 251 | 250 | 250 | 249 | 248 | 248 | 247 |
| Look-up table memory 7   Input I₅ | 255 | 254 | 253 | 252 | 251 | 250 | 249 | 248 | 247 | 246 | 245 | 244 | 243 | 242 |
| Look-up table memory 7   Output | 255 | 254 | 253 | 252 | 251 | 250 | 249 | 248 | 247 | 246 | 245 | 244 | 243 | 242 |
| Density value of the pixels I₁ to I₉ | 241 | 240 | — | — | — | — | — | — | — | — | — | — | — | 160 |
| Output of the look-up table memories $37_{-1}$, $37_{-3}$, $37_{-7}$, $37_{-9}$ | 120 | 120 | — | — | — | — | — | — | — | — | — | — | — | 0 |
| Output of the look-up table memories $37_{-2}$, $37_{-4}$, $37_{-6}$, $37_{-8}$ | 482 | 480 | — | — | — | — | — | — | — | — | — | — | — | 0 |
| Output of the adders $34_{-1}$ to $34_{-4}$ | 301 | 300 | — | — | — | — | — | — | — | — | — | — | — | 0 |
| Output of the adders $34_{-5}$, $34_{-6}$ | 301 | 300 | — | — | — | — | — | — | — | — | — | — | — | 0 |
| Output of the adder $34_{-7}$ | 301 | 300 | — | — | — | — | — | — | — | — | — | — | — | 0 |
| Output of the look-up table memory $37_{-5}$ | 120 | 120 | — | — | — | — | — | — | — | — | — | — | — | 0 |
| Output of the adder $34_{-8}$ | 421 | 420 | — | — | — | — | — | — | — | — | — | — | — | 0 |
| Look-up table memory 38   Input | 431 | 430 | 429 | 428 | 427 | 426 | 425 | 424 | 423 | 422 | 421 | 420 | — | 0 |
| Look-up table memory 38   Output | 247 | 246 | 246 | 245 | 244 | 244 | 243 | 243 | 242 | 242 | 241 | 240 | — | 0 |
| Look-up table memory 7   Input I₅ | 241 | 240 | — | — | — | — | — | — | — | — | — | — | — | 0 |
| Look-up table memory 7   Output | 241 | 240 | — | — | — | — | — | — | — | — | — | — | — | 0 |

TABLE 5

| Density value of the pixels I₁ to I₉ | 255 | 254 | 253 | 252 | 251 | 250 | 249 | 248 | 247 | 246 | 245 | 244 | 243 | 242 |
|---|---|---|---|---|---|---|---|---|---|---|---|---|---|---|
| Output of the look-up $37_{-3}$, $37_{-7}$, $37_{-9}$ | 392 | 390 | 389 | 387 | 386 | 384 | 383 | 381 | 279 | 378 | 376 | 375 | 373 | 372 |
| Output of the look-up table memories $37_{-2}$, $37_{-4}$, $37_{-6}$, $37_{-8}$ | 510 | 508 | 506 | 504 | 502 | 500 | 498 | 496 | 494 | 492 | 490 | 488 | 486 | 484 |
| Output of the adders $34_{-1}$ to $34_{-4}$ | 451 | 449 | 447 | 445 | 444 | 442 | 440 | 438 | 436 | 435 | 433 | 431 | 429 | 428 |
| Output of the adders $34_{-5}$, $34_{-6}$ | 451 | 449 | 447 | 445 | 444 | 442 | 440 | 438 | 436 | 435 | 433 | 431 | 429 | 428 |
| Output of the adder $34_{-7}$ | 451 | 449 | 447 | 445 | 444 | 442 | 440 | 438 | 436 | 435 | 433 | 431 | 429 | 428 |
| Output of the look-up table memory $37_{-5}$ | 78 | 78 | 77 | 77 | 77 | 76 | 76 | 76 | 75 | 75 | 75 | 75 | 74 | 74 |
| Output of the adder $34_{-8}$ | 529 | 527 | 524 | 522 | 521 | 518 | 516 | 514 | 511 | 510 | 508 | 506 | 503 | 502 |
| Look-up table memory 38   Input | 529 | 528 | 527 | 526 | 525 | 524 | 523 | 522 | 521 | 520 | 519 | 518 | 517 | 515 |
| Look-up table memory 38   Output | 255 | 255 | 254 | 254 | 253 | 253 | 253 | 252 | 251 | 251 | 250 | 250 | 250 | 249 |
| Look-up table memory 7   Input I₅ | 255 | 254 | 253 | 252 | 251 | 250 | 249 | 248 | 247 | 246 | 245 | 244 | 243 | 242 |
| Look-up table memory 7   Output | 255 | 254 | 253 | 252 | 251 | 250 | 249 | 248 | 247 | 246 | 245 | 244 | 243 | 242 |
| Density value of the pixels I₁ to I₉ | 241 | 240 | — | — | — | — | — | — | — | — | — | — | — | 0 |
| Output of the look-up table memories $37_{-1}$, $37_{-3}$, $37_{-7}$, $37_{-9}$ | 370 | 369 | — | — | — | — | — | — | — | — | — | — | — | 0 |
| Output of the look-up table memories $37_{-2}$, $37_{-4}$, $37_{-6}$, $37_{-8}$ | 482 | 480 | — | — | — | — | — | — | — | — | — | — | — | 0 |

TABLE 5-continued

| | | | | | | | | | | | | | | | |
|---|---|---|---|---|---|---|---|---|---|---|---|---|---|---|---|
| Output of the adders 34₋₁ to 34₋₄ | | 426 | 424 | — | — | — | — | — | — | — | — | — | — | — | 0 |
| Output of the adders 34₋₅, 34₋₆ | | 426 | 424 | — | — | — | — | — | — | — | — | — | — | — | 0 |
| Output of the adder 34₋₇ | | 426 | 424 | — | — | — | — | — | — | — | — | — | — | — | 0 |
| Output of the look-up table memory 37₋₅ | | 74 | 73 | — | — | — | — | — | — | — | — | — | — | — | 0 |
| Output of the adder 34₋₈ | | 500 | 497 | — | — | — | — | — | — | — | — | — | — | — | 0 |
| Look-up table memory 38 | Input | 515 | 514 | 513 | 512 | 511 | 510 | 509 | 508 | 507 | 506 | — | — | — | 0 |
| | Output | 249 | 248 | 248 | 247 | 247 | 246 | 246 | 245 | 245 | 244 | — | — | — | 0 |
| Look-up table memory 7 | Input I₅ | 241 | 240 | — | — | — | — | — | — | — | — | — | — | — | 0 |
| | Output | 241 | 240 | — | — | — | — | — | — | — | — | — | — | — | 0 |

We claim:

1. A method for producing a sharpness emphasis signal in an electronic image reproduction comprising the steps of:
    (a) summing products of the density values of a matrix of pixels and weight coefficients respectively assigned to the pixels and having a specified number of bits to form an unsharp signal having the specific number of bits;
    (b) forming a new sharp signal identical to the unsharp signal obtained in the step (a) by adjusting an innate sharp signal obtained from the center pixel of the pixels in said matrix having the same density values for each of the matrix pixel elements;
    (c) multiplying a difference between the new sharp signal and the unsharp signal by an emphasis coefficient to provide a signal; and
    (d) adding the signal obtained in the step (c) to the innate sharp signal to produce said sharpness emphasis signal.

2. A method as recited in claim 1, in which the specified number of bits is identical to the number of bits used for expressing image data.

3. A method as recited in claim 1, comprising the further step of using image data of the center pixel for forming the unsharp signal.

4. A method as recited in claim 1 comprising the further step of adjusting the second largest of the weight coefficients so as not to exceed a maximum value expressible by the specified number of bits.

5. A method as recited in claim 1, comprising the step of adjusting the weight coefficients so that the result of said summing step never exceeds a maximum value expressible by the specified number of bits.

6. A method for producing a sharpness emphasis signal in an electronic image reproduction comprising the steps of:
    (a) summing products of the density values of a matrix of pixels and weight coefficients respectively assigned to the pixels and having a specified number of bits to form an output signal having one bit more than the specified number of bits;
    (b) converting the output signal obtained in step (a) to n unsharp signal having a specified number of bits;
    (c) forming a new sharp signal identical to the unsharp signal obtained in the step (b) by adjusting and innate sharp signal obtained from the center pixel of the pixels in said matrix having the same density values for each of the matrix pixel elements;
    (d) multiplying a difference between the new sharp signal and the unsharp signal by an emphasis coefficient to provide a signal; and
    (e) adding the signal obtained in the step (d) to the innate sharp signal to produce said sharp emphasis signal.

7. A method as recited in claim 6, in which the specified number of bits is identical to the number of bits used for expressing image data.

8. A method as recited in claim 6, comprising the further step of using image data of the center pixel for forming the unsharp signal.

9. A method as recited in claim 6 comprising the further step of adjusting the second largest of the weight coefficients so as not to exdeed a maximum value expressible by the specified number of bits.

10. A method as recited in claim 6, in which the value obtained in the conversion step (b) takes less than all the values expressible by the specified number of bits.

11. A method for producing a sharpness emphasis signal in an electronic image reproduction comprising the steps of:
    (a) summing products of density values of a matrix of pixels and weight coefficients respectively assigned to the pixels and having a number of bits one more than a specified number of bits for form an output signal having at least one bit more than the specified number of bits;
    (b) converting the output signal obtained in the step (a) to an unsharp signal having the specified number of bits;
    (c) multiplying the difference value between a sharp signal obtained from the center pixel of the pixels in said matrix and the unsharp signal by an emphasis coefficient to provide a signal; and
    (d) adding the signal obtained in the step (c) to the sharp signal to produce said sharpness emphasis signal.

12. A method as recited in claim 11 in which the specified number of bits is identical to the number of bits used for expressing image data.

13. A method as recited in claim 11 comprising the further step of using image data of the center pixel for forming the unsharp signal.

14. A method as recited in claim 11 comprising the step of adjusting the second largest of the weight coefficients so as not to exceed a maximum value expressible in by one more than the specified number of bits.

15. A method as recited in claim 11 comprising the further step of assigning to the value obtained in the conversion step (b) all the values expressible by the specific bits.

16. An apparatus for producing a sharpness emphasis signal in an electronic image reproduction comprising:
    (a) a look-up table memory means for outputting a product of density values of each of plurality of pixels in a matrix and weight coefficients assigned to respective pixels, said look-up table memory means arranged to provide for said weight coefficients a specified number of bits, said table memory means further arranged to receive the density value of the pixels as a reading address thereof, wherein the weight coefficients forming said products are determined so that a second largest thereof does not exceed a maximal value expressible by said specified number of bits;

(b) a summing means for summing each product output by said look-up table memory means in the specified number of bits to obtain an unsharp signal;

(c) a further look-up table memory means for outputting a new sharp signal identical to the unsharp signal obtained from the summing means, said further look-up table memory means arranged to receive an innate sharp signal as a reading address thereof when both the innate sharp signal and the unsharp signal are obtained from an image area where the density values of the pixels are the same;

(d) a multiplying means for multiplying a difference between the new sharp signal and the unsharp signal by an emphasis coefficient and for providing an output product; and (e) an adding means for adding the output product provided by said multiplying means to the innate sharp signal to produce said sharpness emphasis signal.

17. An apparatus as recited in claims 16 wherein said look-up table memory means is arranged to provide for said specified number of bits a number identical to the number of bits used for expressing image data.

18. An apparatus as recited in claim 16 fruther comprising means for using the image data of the center pixel in forming the unsharp signal.

19. An apparatus for producing a sharpness emphasis signal in an electronic image reproduction comprising:

(a) a look-up table memory means for outputting the product of density values of each of a plurality of pixels in a matrix and weight coefficients assigned to respective pixels, said look-up table memory means arranged to provide for said weight coefficients a specified number of bits, said table memory means further arranged to receive the density value of the pixels as a reading address thereof, wherein the weight coefficients forming said products are determined so that a second largest thereof does not exceed a maximal value expressible by said specified number of bits;

(b) a summing means for summing each product output by said look-up table memory means to provide an output having one bit more than the specified number of bits to obtain an unsharp signal;

(c) an additional look-up table memory means for truncating the number of bits of the products summed by said summing means to the specified number of bits, said additional look-up table memory means arranged to receive the summed products as a reading address thereof;

(d) a further look-up table memory means for outputting a new sharp signal identical to the unsharp signal obtained from the additional look-up table memory means arranged to receive an innate sharp signal as a reading address thereof when both the innate sharp signal and the unsharp signal are obtained from an image area where the density values of the pixels are the same;

(e) a multiplying means for multiplying a difference between the new sharp signal and the unsharp signal by an emphasis coefficient and for providing an output product; and (f) an adding means for adding the output product provided by said multiplying means to the innate sharp signal to produce said sharpness emphasis signal.

20. An apparatus as recited in claim 19 wherein said look-up table memory means is arranged to provide for said specified number of bits a number identical to the number of bits used for expressing image data.

21. An apparatus as recited in claim 19 further comprising means for using the image data of the center pixel in forming the unsharp signal.

22. An apparatus for producing a sharpness emphasis signal in an electric image reproduction comprising:

(a) a look-up table memory means for outputting a product of density values of each of a plurality of pixels in a matrix and weight coefficients assigns to respective pixels, said look-up table memory means arranged to provide for said weight coefficients a specified number of bits, said table memory means further arranged to receive the density value of the pixels as a reading address thereof, wherein the weight coefficients forming said products are determined so that a second largest thereof does not exceed a maximal value expressible by said specified number of bits;

(b) a summing means for summing each product output by said look-up table memory means to provide an output having one bit more than the specified number of bits to obtain an unsharp signal;

(c) a further look-up table memory means for outputting a new sharp signal identical to the unsharp signal obtained from the summing means, said further look-up table memory means arranged to receive an innate sharp signal as a reading address thereof when both the innate sharp signal and the unsharp signal are obtained from an image area where the density values of the pixels are the same; and (d) means for forming a sharpness emphasis signal by using the new sharp signal output by the further look-up table memory means and the innate sharp signal obtained from the center pixel to produce said sharpness emphasis signal.

23. An apparatus as recited in claim 22, wherein said look-up table memory means is arranged to provide for said specified number of bits a number identical to the number of bits used for expressing image data.

24. An apparatus as recited in claim 22 further comprising means for using the image data of the center pixel in forming the unsharp signal.

* * * * *